US012700652B2

(12) United States Patent
Lu et al.

(10) Patent No.: US 12,700,652 B2
(45) Date of Patent: Aug. 4, 2026

(54) SIGNAL TRANSCEIVER APPARATUS, FEEDING STRUCTURE, AND ANTENNA

(71) Applicant: HUAWEI TECHNOLOGIES CO., LTD., Shenzhen (CN)

(72) Inventors: Junfeng Lu, Xi'an (CN); Xinming Liu, Xi'an (CN); Yuan Zhang, Xi'an (CN); Shuangfei Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 437 days.

(21) Appl. No.: 18/341,974

(22) Filed: Jun. 27, 2023

(65) Prior Publication Data

US 2023/0344102 A1    Oct. 26, 2023

Related U.S. Application Data

(63) Continuation of application No. PCT/CN2020/140437, filed on Dec. 28, 2020.

(51) Int. Cl.
H01P 1/207        (2006.01)
H01P 1/203        (2006.01)
(Continued)

(52) U.S. Cl.
CPC .............. H01P 1/207 (2013.01); H01P 1/203 (2013.01); H01P 1/208 (2013.01); H01P 1/213 (2013.01); H01P 1/2138 (2013.01); H04B 1/40 (2013.01)

(58) Field of Classification Search
CPC ........ H01P 1/2138; H01P 1/207; H01P 1/203; H01P 1/208
(Continued)

(56) References Cited

U.S. PATENT DOCUMENTS

| | | | |
|---|---|---|---|
| 5,281,934 A | | 1/1994 | Shiau et al. |
| 5,428,325 A | * | 6/1995 | Jachowski .............. H01P 1/205 |
| | | | 333/206 |

(Continued)

FOREIGN PATENT DOCUMENTS

| | | |
|---|---|---|
| CN | 201741780 U | 2/2011 |
| CN | 111009709 A | 4/2020 |

(Continued)

OTHER PUBLICATIONS

Office Action issued in JP2024231604 dated Jun. 26, 2025.
(Continued)

*Primary Examiner* — Rakesh B Patel
(74) *Attorney, Agent, or Firm* — HAUPTMAN HAM, LLP

(57)        ABSTRACT

A signal transceiver apparatus includes a base having a first cavity and a second cavity. A first interface and a first filter circuit are in the first cavity. The first filter circuit is connected to the first interface. The first filter circuit is configured to transmit a signal of a first frequency band. A second interface, a third interface, and a second filter circuit are in the second cavity. The second filter circuit is connected to the second interface. The second filter circuit is configured to transmit a signal of a second frequency band. A connecting component includes a first end in the first cavity connected to the first filter circuit, a third end in the second cavity connected to the second filter circuit, and a second end connected to the third interface. The connecting component is configured to transmit signals of the first and the second frequency bands.

20 Claims, 10 Drawing Sheets

(51) Int. Cl.
*H01P 1/208* (2006.01)
*H01P 1/213* (2006.01)
*H04B 1/40* (2015.01)

(58) Field of Classification Search
USPC ................................................ 333/202–212
See application file for complete search history.

(56) References Cited

U.S. PATENT DOCUMENTS

| | | | |
|---|---|---|---|
| 5,751,199 A | 5/1998 | Shiau et al. | |
| 6,178,339 B1 | 1/2001 | Sakai et al. | |
| 2008/0291110 A1 * | 11/2008 | Xiong ...................... | H01Q 3/40 |
| | | | 343/852 |

FOREIGN PATENT DOCUMENTS

| | | |
|---|---|---|
| CN | 111710948 A | 9/2020 |
| JP | H05291181 A | 11/1993 |
| JP | H05291811 A | 11/1993 |

OTHER PUBLICATIONS

Japanese Office Action issued in corresponding Japanese Patent Application No. 2023-539241, dated Aug. 27, 2024, pp. 1-8.
International Search Report issued in corresponding International Application No. PCT/CN2020/140437, dated Sep. 29, 2021, pp. 1-10.
Extended European Search Report issued in corresponding European Application No. 20967354.0, dated Jan. 16, 2024, pp. 1-9.
Chinese Office Action issued in corresponding Chinese Application No. 202080105270.2, dated Jun. 19, 2024, p. 1-8.
Office Action issued in JP2024-231604 dated Oct. 16, 2025.

* cited by examiner

Pout4    Pout3         Pin      Pout1    Pout2

01

SIGNAL TRANSCEIVER APPARATUS, FEEDING STRUCTURE, AND ANTENNA

CROSS-REFERENCE TO RELATED APPLICATIONS

This application is a continuation of International Application No. PCT/CN2020/140437, filed Dec. 28, 2020, the disclosure of which is hereby incorporated by reference in its entirety.

TECHNICAL FIELD

Embodiments of this application relate to the field of communication technologies, and in particular, to a signal transceiver apparatus, a feeding structure, and an antenna.

BACKGROUND

A signal transceiver apparatus, for example, a combiner, is an important part of a base station antenna. A function of the signal transceiver apparatus is to combine two or more paths of radio frequency signals sent from different transmitters into one path of signal and send the path of signal to a radio frequency device for transmission of the antenna, and avoid mutual impact between port signals at the same time.

The signal transceiver apparatus usually includes a plurality of cavities, and a section of filter circuit is disposed in each cavity. As shown in FIG. 1, FIG. 2, and FIG. 3, the signal transceiver apparatus further includes: a connecting member 01, where the connecting member 01 is configured to connect filter circuits in adjacent cavities.

However, an assembly tolerance of the connecting member is large, and passive intermodulation (PIM) performance of the signal transceiver apparatus is easily affected.

SUMMARY

Embodiments of this application provide a signal transceiver apparatus, a feeding structure, and an antenna, to resolve a problem that passive intermodulation performance of the signal transceiver apparatus is poor.

To achieve the foregoing objectives, the following technical solutions are used in this application.

According to a first aspect of this application, a signal transceiver apparatus is provided, including: a first cavity, where a first interface is disposed on the first cavity; a first filter circuit, where the first filter circuit is disposed in the first cavity, the first filter circuit includes a first end and a second end opposite to each other, the first end of the first filter circuit is connected to the first interface, and the first filter circuit is configured to transmit a signal of a first frequency band; a second cavity, where a second interface and a third interface are disposed on the second cavity, and the first filter circuit and the second filter circuit are parallel; a second filter circuit, where the second filter circuit is disposed in the second cavity, the second filter circuit includes a first end and a second end opposite to each other, the first end of the second filter circuit is connected to the second interface, and the second filter circuit is configured to transmit a signal of a second frequency band; and a connecting component, where the connecting component includes a first end and a second end opposite to each other, and a third end located between the first end of the connecting component and the second end of the connecting component, the first end of the connecting component is located at the first cavity, the first end of the connecting component is connected to the second end of the first filter circuit, the third end of the connecting component is located at the second cavity, the third end of the connecting component is connected to the second end of the second filter circuit, and the second end of the connecting component is connected to the third interface; and the connecting component uses an integrated structure, and the connecting component is configured to transmit signals of the first frequency band and the second frequency band. Therefore, compared with the conventional technology in which filter circuits in different cavities are connected through a plurality of connection structures, the integrated structure of the connecting component reduces an assembly tolerance and improve passive intermodulation performance of the signal transceiver apparatus.

In an optional implementation, the signal transceiver apparatus further includes: a first printed circuit board PCB, where the first filter circuit is disposed on the first PCB, a first engaging slot is provided in the first cavity, and the first PCB is detachably connected to the first engaging slot; and a second PCB, where the second filter circuit is disposed on the second PCB, a second engaging slot is provided in the second cavity, and the second PCB is detachably connected to the second engaging slot. Therefore, an assembly manner is simpler and assembly difficulty is reduced.

In an optional implementation, a first opening is provided on the first cavity, and a shape of the first opening matches a shape of the first PCB, so that the first PCB can be engaged with the first engaging slot through the first opening; and a second opening is provided on the second cavity, and a shape of the second opening matches a shape of the second PCB, so that the second PCB can be engaged with the second engaging slot through the second opening. Therefore, after the first cavity and the second cavity are respectively formed, the first PCB may be mounted through the first opening, and the second PCB may be mounted through the second opening, thereby reducing the assembly difficulty.

In an optional implementation, a first welding port is disposed on the first cavity, and the first welding port is located above the first end of the connecting component, so that the first end of the connecting component and the second end of the first filter circuit are welded through the first welding port; and a second welding port is disposed on the second cavity, and the second welding port is located above the third end of the connecting component, so that the third end of the connecting component and the second end of the second filter circuit are welded through the second welding port. Therefore, after the first cavity and the second cavity are respectively formed, the connecting component and the first filter circuit may be welded through the first welding port, and the connecting component and the second filter circuit may be welded through the second welding port, thereby reducing the assembly difficulty.

In an optional implementation, a third opening is provided on the first cavity or the second cavity, and a shape of the third opening matches a shape of the connecting component, so that the connecting component can enter the first cavity and the second cavity through the third opening. Therefore, after the first cavity and the second cavity are respectively formed, the connecting component may be mounted through the third opening, thereby reducing the assembly difficulty.

In an optional implementation, the signal transceiver apparatus further includes: a third cavity, where the third cavity is located between the first cavity and the second cavity, and a fourth interface is disposed on the third cavity; and a third filter circuit, where the third filter circuit is disposed in the third cavity, the third filter circuit includes a first end and a second end opposite to each other, the first end of the third filter circuit is connected to the third interface, the second end of the third filter circuit is connected to a fourth end of the connecting component, and the third filter circuit is configured to transmit a signal of a third frequency band; and the fourth end of the connecting component is located between the first end of the connecting component and the third end of the connecting component, and the connecting component is further configured to transmit the signal of the third frequency band. Therefore, the connecting component may be connected to a plurality of filter circuits simultaneously, and a plurality of paths of signals may be combined into one path of signal, or one path of signal may be divided into a plurality of paths of signals. In addition, the connecting component uses an integrated structure. This reduces the assembly tolerance and improves the passive intermodulation performance of the signal transceiver apparatus.

In an optional implementation, the signal transceiver apparatus further includes: a third PCB, where the third filter circuit is disposed on the third PCB, a third engaging slot is provided in the third cavity, and the third PCB is detachably connected to the third engaging slot; and a fourth opening is provided on the third cavity, and a shape of the fourth opening matches a shape of the third PCB. Therefore, after the third cavity is formed, the third PCB may be mounted through the fourth opening, thereby reducing the assembly difficulty.

In an optional implementation, a third welding port is disposed on the third cavity, and the third welding port is located above the fourth end of the connecting component, so that the fourth end of the connecting component and the second end of the third filter circuit are welded through the third welding port. Therefore, after the third cavity is formed, the connecting component and the third filter circuit may be welded through the third welding port, thereby reducing the assembly difficulty.

In an optional implementation, the first interface, the second interface, and the fourth interface are configured to connect to a signal input end, and the third interface is configured to connect to a signal output end; or the first interface, the second interface, and the fourth interface are configured to connect to a signal output end, and the third interface is configured to connect to a signal input end. Therefore, the signal transceiver apparatus may combine a plurality of paths of signals into one path of signal through the connecting component, or may divide one path of signal into a plurality of paths of signals, so that the signal transceiver apparatus is more widely used.

In an optional implementation, the first filter circuit, the second filter circuit, and the third filter circuit each include: a main transmission line and a plurality of open circuit filter stubs connected to the main transmission line. Therefore, a passband signal can be transmitted through the main transmission line.

In an optional implementation, a length of the open circuit filter stub is $$\frac{\lambda_1}{8} \text{ to } \frac{\lambda_1}{2},$$

where $\lambda_1$ is a wavelength corresponding to a stopband signal frequency band. Therefore, the open circuit filter stub may be used as a resonator to generate resonance in the stopband frequency band, and a stopband signal can be transmitted back and forth only on the open circuit filter stub, so that the stopband signal can be filtered out.

In an optional implementation, the connecting component includes at least one impedance-transformed transmission line segment, and a length of the impedance-transformed transmission line segment is greater than $$\frac{\lambda_2}{12},$$

where $\lambda_2$ is a wavelength corresponding to a maximum frequency in an input signal. Therefore, impedance matching may be performed on signals of different frequency bands through the impedance-transformed transmission line segment, so that the connecting component can transmit signals of different frequency bands simultaneously.

According to a second aspect of this application, a feeding structure is further provided, including: a phase shifter and the signal transceiver apparatus described above, where the phase shifter is electrically connected to the signal transceiver apparatus. Therefore, the foregoing signal transceiver apparatus is used in the feeding structure. This reduces an assembly tolerance and improves passive intermodulation performance of a system.

According to the second aspect of this application, an antenna is further provided, including: at least one antenna array, where the antenna array includes: at least one radiating element, a reflection panel, and the feeding structure described above, where the radiating element is disposed above the reflection panel, and the feeding structure is connected to the radiating element. Therefore, the antenna uses the foregoing feeding structure, and has a same effect as the foregoing feeding structure. Details are not described herein again.

In an optional implementation, the antenna further includes: a radome, where the radiating element, the reflection panel, and the feeding structure are located in a cavity enclosed by the radome. Therefore, the radome can reduce an impact of an external environment on the antenna.

DESCRIPTION OF EMBODIMENTS

To make the objectives, technical solutions, and advantages of this application clearer, the following further describes this application in detail with reference to the accompanying drawings.

The terms "first" and "second" mentioned below are merely intended for a purpose of description, and shall not be understood as an indication or implication of relative importance or implicit indication of the number of indicated technical features. Therefore, a feature defined by "first" or "second" can explicitly or implicitly include one or more features. In description of this application, unless otherwise stated, "a plurality of" means two or more.

In addition, in this application, orientation terms such as "up" and "down" are defined relative to an orientation in which a component is schematically placed in the accompanying drawings. It should be understood that these directional terms are relative concepts and are used for relative description and clarification, and may vary accordingly depending on the orientation in which the component is placed in the accompanying drawings.

The following describes possible terms in embodiments of this application.

Insertion loss is a loss of load power that occurs at a position in a transmission system due to an insertion of a component or device, and the loss is expressed as a ratio, in decibels, of power received on the load before the insertion of the component or device to power received on the same load after the insertion.

Passive Intermodulation (PIM): A spurious signal is generated when two or more frequencies are mixed together in a non-linear device.

Figure 4:
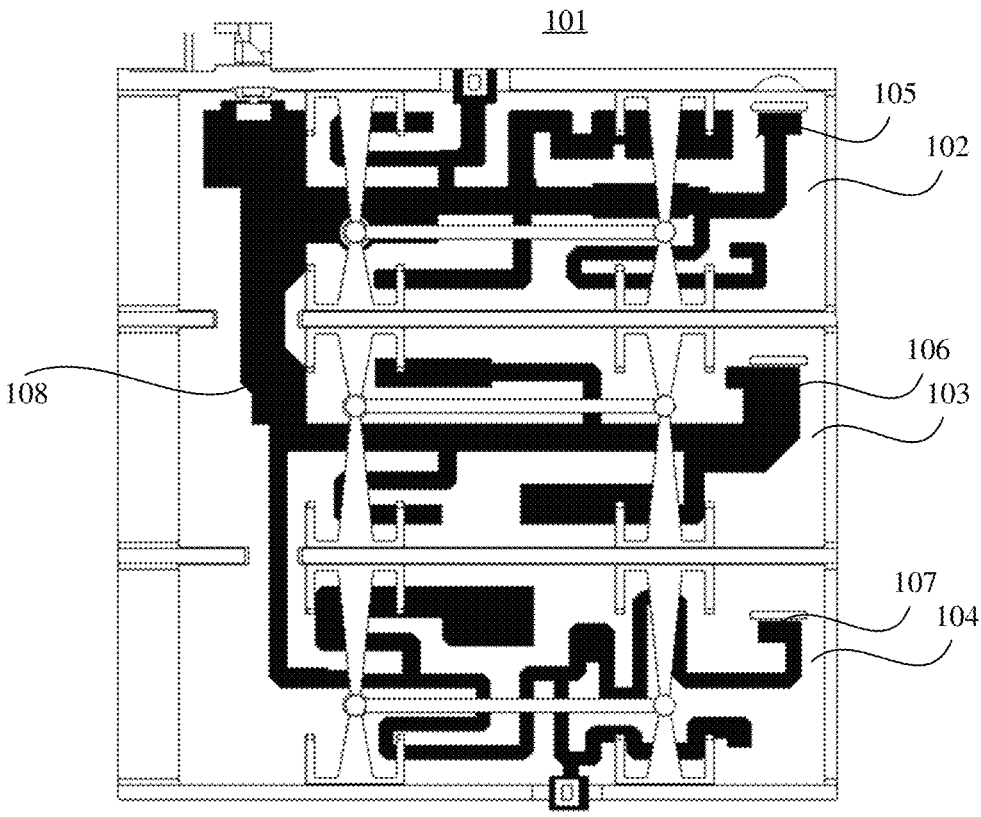
FIG. 4 is a schematic diagram of a structure of another signal transceiver apparatus.

An embodiment of this application provides a signal transceiver apparatus. The signal transceiver apparatus includes two or more cavities. As shown in FIG. 4, the signal transceiver apparatus 101 includes: a first cavity 102, a second cavity 104, and a third cavity 103.

A first filter circuit 105 is disposed in the first cavity 102, a second filter circuit 107 is disposed in the second cavity 104, and a third filter circuit 106 is disposed in the third cavity 103.

The signal transceiver apparatus 101 further includes: a connecting component 108, where the connecting component 108 includes a first end and a second end opposite to each other, and a third end and a fourth end that are located between the first end of the connecting component 108 and the second end of the connecting component 108.

The first end of the connecting component 108 is located at the first cavity 102, and the first end of the connecting component 108 is connected to a second end of the first filter circuit 105. The third end of the connecting component 108 is located at the second cavity 104, and the third end of the connecting component 108 is connected to a second end of the second filter circuit 107. The fourth end of the connecting component 108 is located at the third cavity 106, and the fourth end of the connecting component 108 is connected to a second end of the third filter circuit 106. The second end of the connecting component 108 is connected to an interface on the second cavity.

In some embodiments of this application, the connecting component 108, the first filter circuit 105, the second filter circuit 107, and the third filter circuit 106 are integrally formed, and the connecting component 108, the first filter circuit 105, the second filter circuit 107, and the third filter circuit 106 are all disposed on a printed circuit board (PCB). The connecting component 108 transversely passes through the three cavities.

Figure 5:
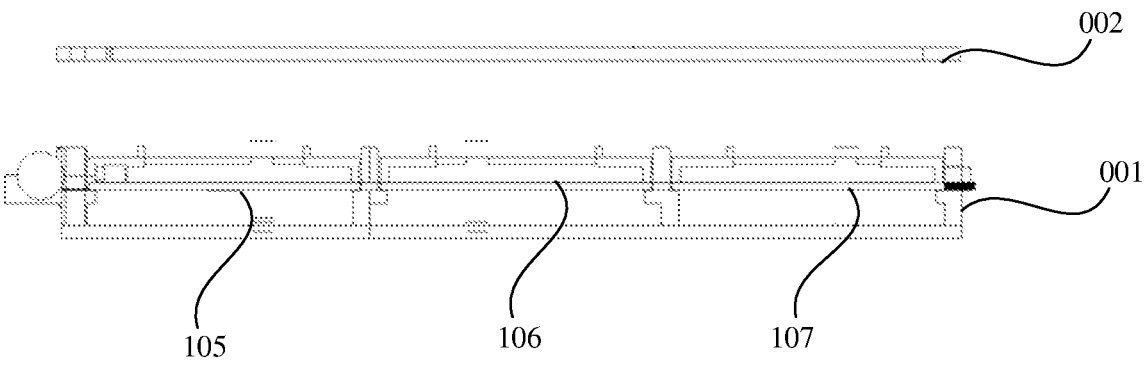
FIG. 5 is a schematic diagram of a disassembled structure of the signal transceiver apparatus in FIG. 4.

As shown in FIG. 5, the signal transceiver apparatus 101 includes: a base 001 and a cover plate 002. During assembly, the connecting component 108, the first filter circuit 105, the second filter circuit 107, and the third filter circuit 106 are first assembled on the PCB, the assembled PCB is mounted on the base 001, and finally the cover plate 002 is welded to the base 001.

However, the foregoing assembly manner easily affects passive intermodulation (PIM) performance of the signal transceiver apparatus 101, and has a high requirement on an assembly process, which increases assembly difficulty and makes maintenance difficult.

Therefore, an embodiment of this application provides an improved signal transceiver apparatus 101.

Figure 6:
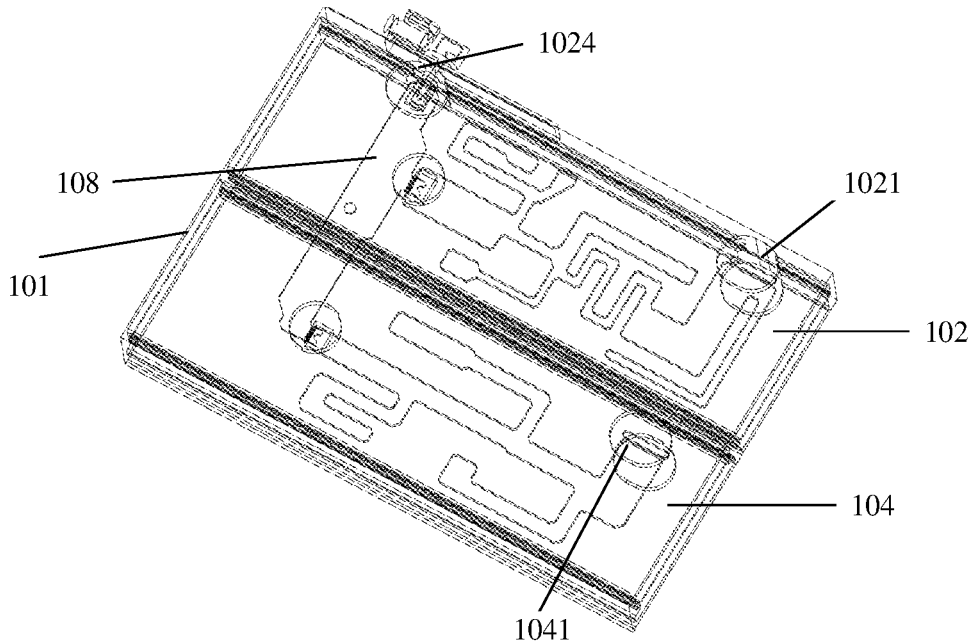
FIG. 6 is a schematic diagram of a structure of a signal transceiver apparatus according to an embodiment of this application.
Figure 7:
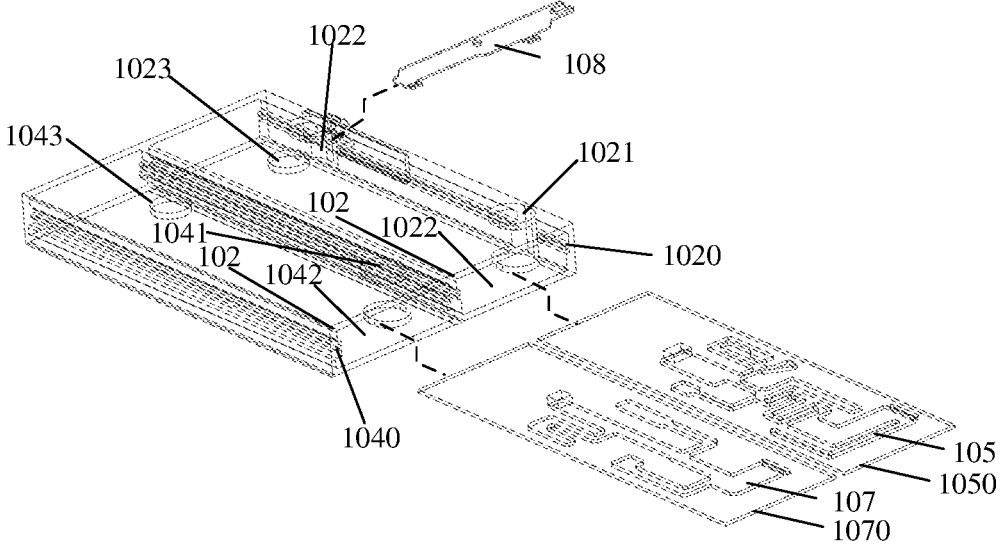
FIG. 7 is a schematic diagram of a disassembled structure of the signal transceiver apparatus in FIG. 6.

In some embodiments of this application, as shown in FIG. 6 and FIG. 7, the signal transceiver apparatus 101 includes: a first cavity 102 and a second cavity 104.

A first filter circuit 105 is disposed in the first cavity 102, and a first interface 1021 is disposed on the first cavity 102.

The first filter circuit 105 includes a first end and a second end opposite to each other, the first end of the first filter circuit 105 is connected to the first interface 1021, and the first filter circuit 105 transmits a signal of a first frequency band.

A second filter circuit 107 is disposed in the second cavity 104, and a second interface 1041 is disposed on the second cavity 104, and a third interface 1024 is disposed on the first cavity 102. The first filter circuit 105 and the second filter circuit 107 are parallel.

It should be noted that the foregoing parallel is not parallel in a strict mathematical sense, and an error may exist. If the error is less than a preset threshold, it is considered that the first filter circuit and the second filter circuit are parallel.

It should be noted that, in some other embodiments of this application, for example, the third interface 1024 may be disposed on the second cavity 104.

The second filter circuit 107 includes a first end and a second end opposite to each other, the first end of the second filter circuit 107 is connected to the second interface 1041, and the second filter circuit 107 is configured to transmit a signal of a second frequency band.

The signal transceiver apparatus 101 further includes: a connecting component 108, where the connecting component 108 includes a first end and a second end opposite to each other, and a third end located between the first end of the connecting component 108 and the second end of the connecting component 108.

The first end of the connecting component 108 is located at the first cavity 102, and the first end of the connecting component 108 is connected to the second end of the first filter circuit 105. The third end of the connecting component 108 is located at the second cavity 104, and the third end of the connecting component 108 is connected to the second end of the second filter circuit 107. The second end of the connecting component 108 is connected to the third interface 1024.

The connecting component 108 is configured to transmit signals of the first frequency band and the second frequency band.

In use, the connecting component 108 may combine a plurality of paths of signals into one path of signal for output, or may divide one path of signal into a plurality of paths of signals for output.

In some embodiments, the first interface 1021 and the second interface 1041 are configured to connect to a signal input end, and the third interface 1024 is configured to connect to a signal output end.

During working, the first interface 1021 may be configured to receive the signal of the first frequency band, and transfer the received signal of the first frequency band to the first filter circuit 105. The first filter circuit 105 may transfer the signal to the connecting component 108. The second interface 1041 may be configured to receive the signal of the second frequency band, and transfer the received signal of the second frequency band to the second filter circuit 107, and then the second filter circuit 107 transfers the signal to the connecting component 108.

In this embodiment, the connecting component 108 may combine the signal of the first frequency band and the signal of the second frequency band into one path of signal and transfer the path of signal to the third interface 1024, and the third interface 1024 outputs the combined signal.

In some other embodiments, the first interface 1021 and the second interface 1041 are configured to connect to a signal output end, and the third interface 1024 is configured to connect to a signal input end.

During working, the third interface 1024 may be configured to receive the signal of the first frequency band, and transfer the received signal of the first frequency band to the connecting component 108.

In this embodiment, the connecting component 108 may divide one path of signal into two paths of signals, transfer one path of signal to the first filter circuit 105, and transfer the other path of signal to the second filter circuit 107. The first filter circuit 105 may transfer the signal to the first interface 1021, and the second filter circuit 107 may transfer the signal to the second interface 1041, so that the divided signals are respectively output through the first interface 1021 and the second interface 1041.

The connecting component 108 uses an integrated structure. A part of the connecting component 108 is located in the first cavity 102, the other part of the connecting component 108 is located in the second cavity 104, and the connecting component 108 is separately connected to the first filter circuit 105, the second filter circuit 107, and the third interface 1024. Compared with the conventional technology in which filter circuits in different cavities and the second interface 1041 are connected through a plurality of connection structures, an assembly tolerance is reduced, and passive intermodulation performance of the signal transceiver apparatus 101 is improved.

Figure 1:
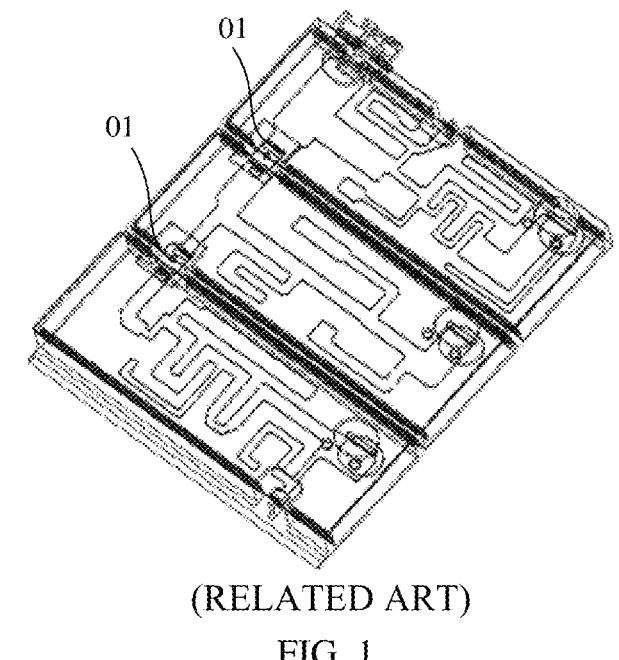
FIG. 1 is a schematic diagram of a structure of a signal transceiver apparatus.
Figure 2:
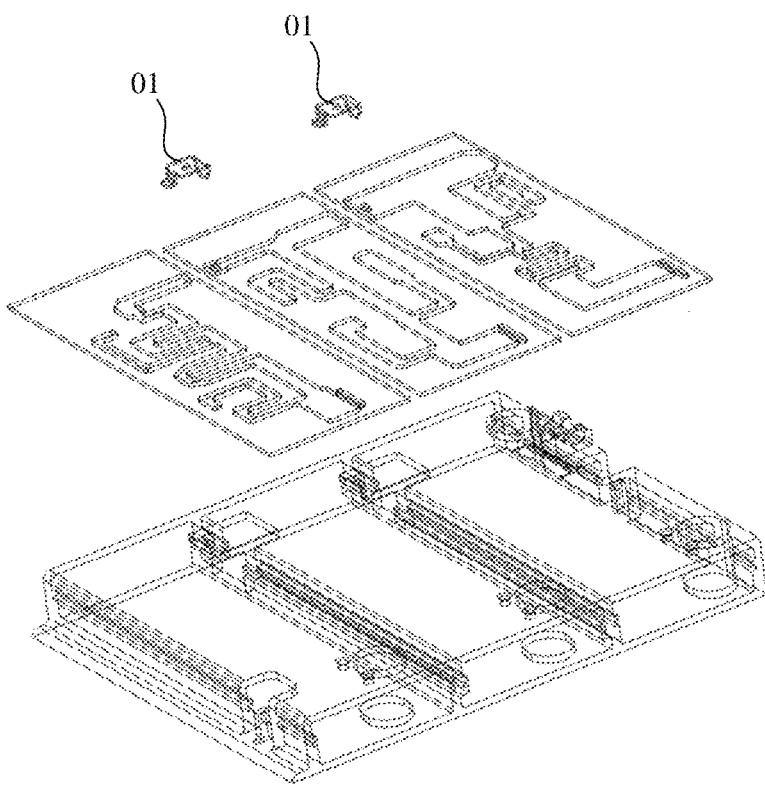
FIG. 2 is a schematic diagram of a disassembled structure of the signal transceiver apparatus in FIG. 1.
Figure 3:
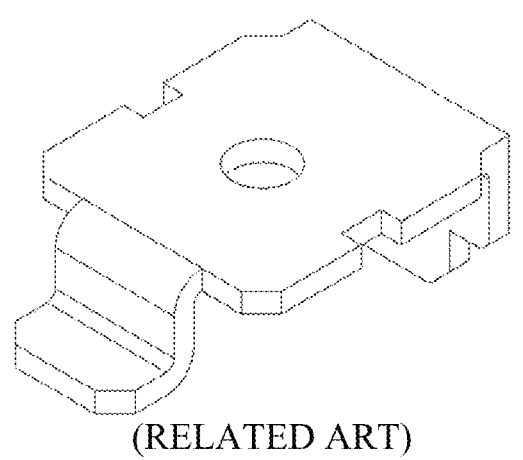
FIG. 3 is a schematic diagram of a structure of a connecting member.

A manner of assembling the connecting component 108 and the first filter circuit 105 and the second filter circuit 107 is not limited in embodiments of this application. In some embodiments, as shown in FIG. 3, the signal transceiver apparatus 101 further includes: a first PCB 1050 and a second PCB 1070, where the first filter circuit 105 is disposed on the first PCB 1050, a first engaging slot 1020 is provided in the first cavity 102, and the first PCB 1050 is detachably connected to the first engaging slot 1020.

For example, a first opening 1022 is provided on the first cavity 102. A shape of the first opening 1022 matches a shape of the first PCB 1050, so that the first PCB 1050 can be engaged with the first engaging slot 1020 through the first opening 1022.

When the first PCB 1050 is assembled, the first PCB 1050 provided with the first filter circuit 105 may be inserted into the first cavity 102 through the first opening 1022, and engaged with the first engaging slot 1020.

The second filter circuit 107 is disposed on the second PCB 1070, a second engaging slot 1040 is provided in the second cavity 104, and the second PCB 1070 is detachably connected to the second engaging slot 1040.

For example, a second opening 1042 is provided on the second cavity 104. A shape of the second opening 1042 matches a shape of the second PCB 1070, so that the second PCB 1070 can be engaged with the second engaging slot 1040 through the second opening 1042.

When the second PCB 1070 is assembled, the second PCB 1070 provided with the second filter circuit 107 may be inserted into the first cavity 102 through the second opening 1042, and engaged with the second engaging slot 1040.

In addition, a third opening 1022 is provided on the first cavity 102, and a shape of the third opening 1022 matches a shape of the connecting component 108, so that the connecting component 108 can enter the first cavity 102 and the second cavity 104 through the third opening 1022.

In some other embodiments of this application, the third opening 1022 may alternatively be provided on the second cavity 104.

In some embodiments, for example, a third engaging slot (not shown in the figure) matches the connecting component 108 is further provided in the first cavity 102 and the second cavity 104.

When the connecting component 108 is assembled, the connecting component 108 may be inserted into the first cavity 102 and the second cavity 104 through the third opening 1022, and engaged with the third engaging slot.

In some other embodiments, for example, a mounting base (not shown in the figure) is further disposed in the first cavity 102 and the second cavity 104, and the mounting base is configured to mount the connecting component 108.

When the connecting component 108 is assembled, the connecting component 108 may be inserted into the first cavity 102 and the second cavity 104 through the third opening 1022, and is fixedly connected to the mounting base.

A manner of connecting the connecting component 108 to the first filter circuit 105 and the second filter circuit 107 is not limited in embodiments of this application. In some embodiments of this application, the connecting component 108 and the first filter circuit 105 are connected through welding, and the connecting component 108 and the second filter circuit 107 are connected through welding.

For example, a first welding port 1023 is disposed on the first cavity 102, and the first welding port 1023 is located above the first end of the connecting component 108, so that the first end of the connecting component 108 and the second end of the first filter circuit 105 are welded through the first welding port 1023.

When the connecting component 108 and the first filter circuit 105 are welded, the first end of the connecting component 108 and the second end of the first filter circuit 105 may be heated to a molten state through the first welding port 1023, so that the first end of the connecting component 108 and the second end of the first filter circuit 105 are connected as a whole after being cooled.

A second welding port 1043 is disposed on the second cavity 104, and the second welding port 1043 is located above the third end of the connecting component 108, so that the third end of the connecting component 108 and the second end of the second filter circuit 107 are welded through the second welding port 1043.

When the connecting component 108 and the second filter circuit 107 are welded, the third end of the connecting component 108 and the second end of the second filter circuit 107 may be heated to a molten state through the second welding port 1043, so that the third end of the connecting component 108 and the second end of the second filter circuit 107 are connected as a whole after being cooled.

Figure 8:
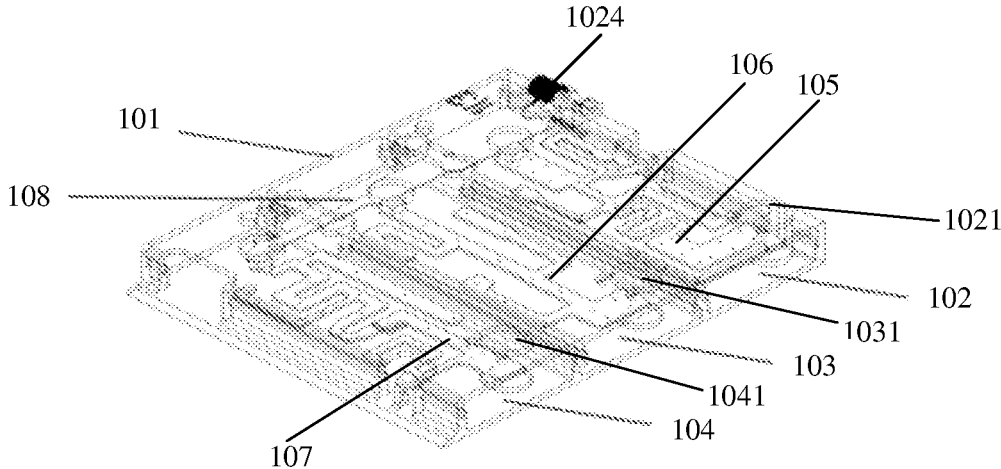
FIG. 8 is a schematic diagram of a structure of another signal transceiver apparatus according to an embodiment of this application.
Figure 9:
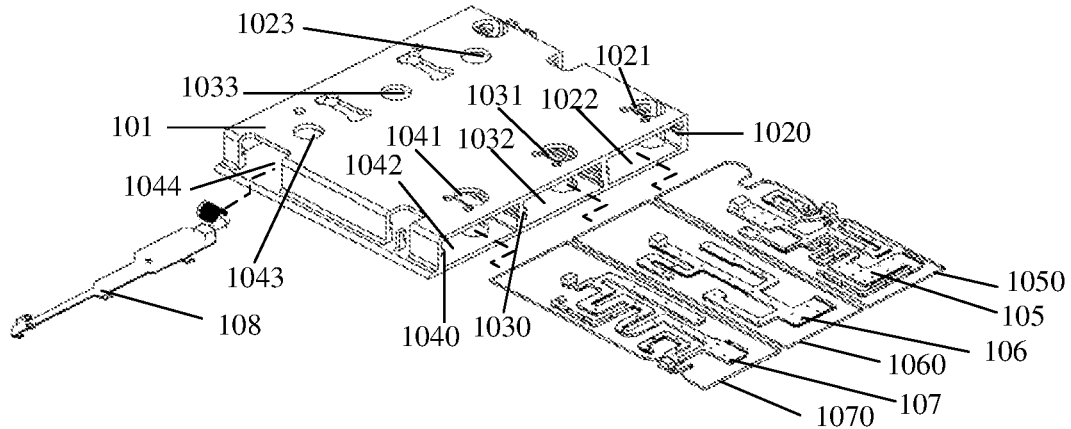
FIG. 9 is a schematic diagram of a disassembled structure of the signal transceiver apparatus in FIG. 8.

In some other embodiments of this application, the signal transceiver apparatus 101 includes three cavities. As shown in FIG. 8 and FIG. 9, the signal transceiver apparatus 101 includes: a first cavity 102, a second cavity 104, and a third cavity 103. For a structure of the first cavity 102 and a structure the second cavity 104, and a connection manner among the first filter circuit 105, the second filter circuit 107, and the connecting component 108, refer to the foregoing embodiments. Details are not described herein again.

The third cavity 103 is located between the first cavity 102 and the second cavity 104, and a fourth interface 1031 is disposed on the third cavity 103.

A third filter circuit 106 is disposed in the third cavity 103, where the third filter circuit 106 includes a first end and a second end opposite to each other, the first end of the third filter circuit 106 is connected to the third interface 1024, and the second end of the third filter circuit 106 is connected to a fourth end of the connecting component 108. The third filter circuit 106 is configured to transmit a signal of a third frequency band.

The fourth end of the connecting component 108 is located between the first end of the connecting component 108 and the third end of the connecting component 108, and the connecting component 108 is further configured to transmit the signal of the third frequency band.

The signal transceiver apparatus 101 further includes: a third PCB 1060, where the third filter circuit 106 is disposed on the third PCB 1060, a third engaging slot 1030 is provided in the third cavity 103, and the third PCB 1060 is detachably connected to the third engaging slot 1030.

For example, a third opening 1022 is provided on the third cavity 103, and a shape of the third opening 1022 matches a shape of the third PCB 1060.

When the third PCB 1060 is assembled, the third PCB 1060 provided with the third filter circuit 106 may be inserted into the third cavity 103 through the third opening 1022, and engaged with the third engaging slot 1030.

In addition, a third welding port 1033 is disposed on the third cavity 103, and the third welding port 1033 is located above the fourth end of the connecting component 108, so that the fourth end of the connecting component 108 and the second end of the third filter circuit 106 are welded through the third welding port 1033.

When the connecting component 108 and the third filter circuit 106 are welding, the fourth end of the connecting component 108 and the second end of the third filter circuit 106 may be heated to a molten state through the third welding port 1033, so that the fourth end of the connecting component 108 and the second end of the third filter circuit 106 are connected as a whole after being cooled.

In some embodiments of this application, the first interface 1021, the second interface 1041, and the fourth interface 1031 are configured to connect to a signal input end, and the third interface 1024 is configured to connect to a signal output end.

During working, the first interface 1021 may be configured to receive the signal of the first frequency band, and transfer the received signal of the first frequency band to the first filter circuit 105. The first filter circuit 105 may transfer the signal to the connecting component 108. The second interface 1041 may be configured to receive the signal of the second frequency band, and transfer the received signal of the second frequency band to the second filter circuit 107. The fourth interface 1031 may be configured to receive the signal of the third frequency band, and transfer the received signal of the third frequency band to the second filter circuit 107, and then the second filter circuit 107 transfers the signal to the connecting component 108.

In this embodiment, the connecting component 108 may combine the signal of the first frequency band, the signal of the second frequency band, and the signal of the third frequency band into one path of signal, and transfer the path of signal to the third interface 1024, and the third interface 1024 outputs the combined signal.

In some other embodiments of this application, the first interface 1021, the second interface 1041, and the fourth interface 1031 are configured to connect to a signal output end, and the third interface 1024 is configured to connect to a signal input end.

During working, the third interface 1024 may be configured to receive the signal of the first frequency band, and transfer the received signal of the first frequency band to the connecting component 108. The connecting component 108 may divide one path of signal into three paths of signals, transfer one path of signal to the first filter circuit 105, transfer one path of signal to the second filter circuit 107, and transfer the third path of signal to the third filter circuit 106. The first filter circuit 105 may transfer the signal to the first interface 1021, the second filter circuit 107 may transfer the signal to the second interface 1041, and the third filter circuit 106 may transfer the signal to the fourth interface 1031, so that the divided signals are respectively output through the first interface 1021 and the second interface 1041.

A case in which the signal transceiver apparatus 101 includes frequency-divide-by-2 and frequency-divide-by-3 is used for description. In another embodiment of this application, the signal transceiver apparatus 101 may include frequency-divide-by-N, where N is a positive integer greater than 1. For the frequency-divide-by-N signal transceiver apparatus 101, refer to a frequency-divide-by-2 structure and a frequency-divide-by-3 structure. Details are not described herein again.

Figure 10:
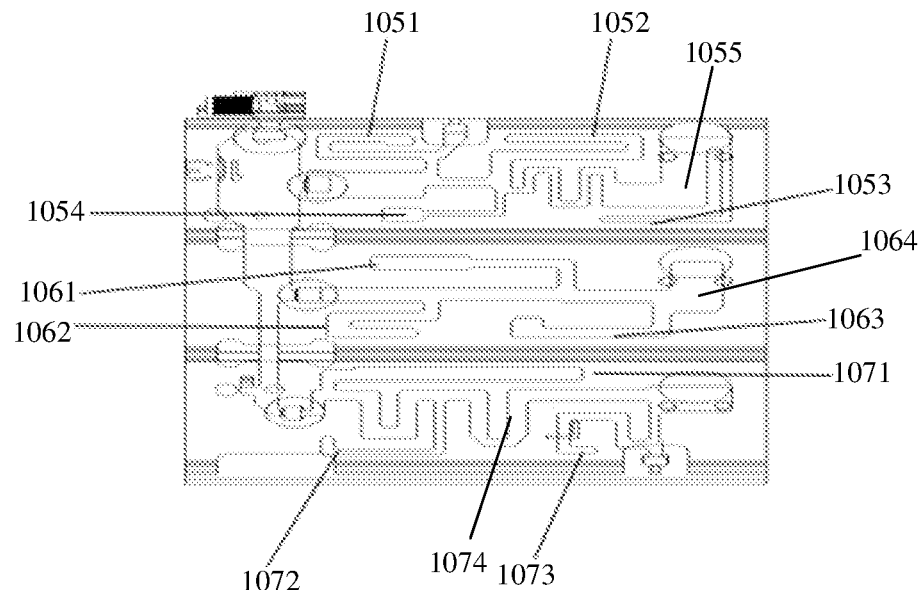
FIG. 10 is a top view of the signal transceiver apparatus in FIG. 8.

The structures of the first filter circuit 105, the second filter circuit 107, and the third filter circuit 106 are not limited in embodiments of this application. As shown in FIG. 10, for example, the first filter circuit 105, the second filter circuit 107, and the third filter circuit 106 each include: a plurality of open circuit filter stubs.

The first filter circuit 105 includes: a first main transmission line 1055, a first filter stub 1051, a second filter stub 1052, a third filter stub 1053, and a fourth filter stub 1054.

One end of the first main transmission line 1055 is connected to the first interface 1021, and the other end of the first main transmission line 1055 is connected to the connecting component 108. For example, the first main transmission line 1055 is configured to transmit the signal of the first frequency band.

One end of the first filter stub 1051, one end of the second filter stub 1052, one end of the third filter stub 1053, and one end of the fourth filter stub 1054 are connected to the first main transmission line 1055, and the other end of the first filter stub 1051, the other end of the second filter stub 1052, the other end of the third filter stub 1053, and the other end of the fourth filter stub 1054 are in an open circuit state. The first filter stub 1051, the second filter stub 1052, the third filter stub 1053, and the fourth filter stub 1054 may be configured to transmit a stopband signal. Because the filter stub uses an open circuit structure, the stopband signal can be transmitted back and forth only on the first filter stub 1051, the second filter stub 1052, the third filter stub 1053, and the fourth filter stub 1054, so that the stopband signal on the main transmission line can be filtered out.

Lengths of the first filter stub 1051, the second filter stub 1052, the third filter stub 1053, and the fourth filter stub 1054 are, for example, $$\frac{\lambda_1}{8} \text{ to } \frac{\lambda_1}{2},$$

where $\lambda_1$ is a wavelength corresponding to a stopband signal frequency band in the first frequency band, so that the first filter stub 1051, the second filter stub 1052, the third filter stub 1053, and the fourth filter stub 1054 may be used as resonators to generate resonance in the stopband frequency band, the stopband signal can be transmitted back and forth only on the open circuit filter stub, and the stopband signal can be filtered out.

The first filter stub 1051, the second filter stub 1052, the third filter stub 1053, and the fourth filter stub 1054 are configured to filter out the stopband signal. It should be noted that, in this embodiment, the stopband signal refers to another signal than a signal of the first frequency band, for example, a signal of the second frequency band and a signal of the third frequency band.

The second filter circuit 107 includes: a second main transmission line 1074, a fifth filter stub 1071, a sixth filter stub 1072, and a seventh filter stub 1073.

One end of the second main transmission line 1074 is connected to the second interface 1041, and the other end of the second main transmission line 1074 is connected to the connecting component 108. For example, the second main transmission line 1074 is configured to transmit a passband signal of the second frequency band.

One end of the fifth filter stub 1071, one end of the sixth filter stub 1072, and one end of the seventh filter stub 1073 are connected to the second main transmission line 1074, and the other end of the fifth filter stub 1071, the other end of the sixth filter stub 1072, and the other end of the seventh filter stub 1073 are in an open circuit state. The fifth filter stub 1071, the sixth filter stub 1072, and the seventh filter stub 1073 may be configured to transmit a stopband signal.

Because the fifth filter stub 1071, the sixth filter stub 1072, and the seventh filter stub 1073 use an open circuit structure, the stopband signal can be transmitted back and forth only on the filter stub, so that the stopband signal on the main transmission line can be filtered out.

Lengths of the fifth filter stub 1071, the sixth filter stub 1072, and the seventh filter stub 1073 are, for example, $$\frac{\lambda_2}{8} \text{ to } \frac{\lambda_2}{2},$$

where $\lambda_2$ is a wavelength corresponding to a stopband signal frequency band in the second frequency band, so that the fifth filter stub 1071, the sixth filter stub 1072, and the seventh filter stub 1073 may be used as resonators to generate resonance in the stopband frequency band, the stopband signal can be transmitted back and forth only on the open circuit filter stub, and the stopband signal can be filtered out. It should be noted that, in this embodiment, the stopband signal refers to another signal than a signal of the second frequency band, for example, a signal of the first frequency band and a signal of the third frequency band.

The third filter circuit 106 includes: a third main transmission line 1064, an eighth filter stub 1061, a ninth filter stub 1062, and a tenth filter stub 1063.

One end of the third main transmission line 1064 is connected to the fourth interface 1031, and the other end of the third main transmission line 1064 is connected to the connecting component 108. For example, the third main transmission line 1064 is configured to transmit a passband signal of the third frequency band.

One end of the eighth filter stub 1061, one end of the ninth filter stub 1062, and one end of the tenth filter stub 1063 are connected to the third main transmission line 1064, and the other end of the eighth filter stub 1061, the other end of the ninth filter stub 1062, and the other end of the tenth filter stub 1063 are in an open circuit state. The eighth filter stub 1061, the ninth filter stub 1062, and the tenth filter stub 1063 may be configured to transmit a stopband signal. Because the filter stub uses an open circuit structure, the stopband signal can be transmitted back and forth only on the eighth filter stub 1061, the ninth filter stub 1062, and the tenth filter stub 1063, so that the stopband signal on the third main transmission line 1064 can be filtered out.

Lengths of the eighth filter stub 1061, the ninth filter stub 1062, and the tenth filter stub 1063 are, for example, $$\frac{\lambda_3}{8} \text{ to } \frac{\lambda_3}{2},$$

where $\lambda_3$ is a wavelength corresponding to a stopband signal frequency band in the third frequency band, so that the eighth filter stub 1061, the ninth filter stub 1062, and the tenth filter stub 1063 may be used as resonators to generate resonance in the stopband frequency band, the stopband signal can be transmitted back and forth only on the open circuit filter stub, and the stopband signal can be filtered out. It should be noted that, in this embodiment, the stopband signal refers to another signal than a signal the third frequency band, for example, a signal of the first frequency band and a signal of the second frequency band.

The first main transmission line 1055, the second main transmission line 1074, the third main transmission line 1064, the first filter stub 1051, the second filter stub 1052, the third filter stub 1053, the fourth filter stub 1054, the fifth filter stub 1071, the sixth filter stub 1072, the seventh filter stub 1073, the eighth filter stub 1061, the ninth filter stub 1062, and the tenth filter stub 1063 may use a bending structure. This can reduce a space size of a filter circuit and facilitate miniaturization of a device.

Figure 11:
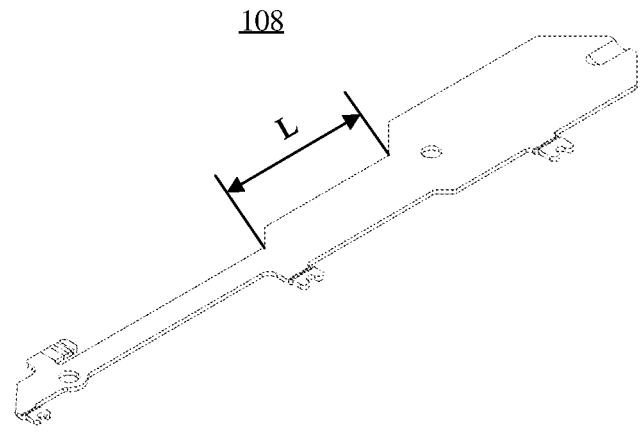
FIG. 11 is a schematic diagram of a structure of a connecting component in FIG. 8.

As shown in FIG. 11, the connecting component 108 includes at least one impedance-transformed transmission line segment. A length of the impedance-transformed transmission line segment is L, where L is greater than $$\frac{\lambda_0}{12},$$

and $\lambda_0$ is a wavelength corresponding to a maximum frequency in an input signal.

Figure 12:
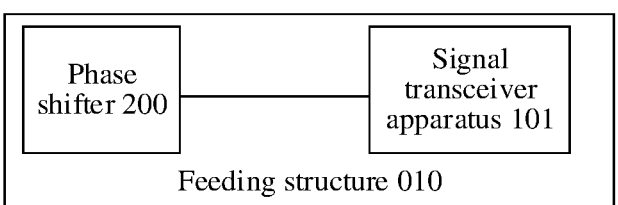
FIG. 12 is a schematic diagram of a structure of a feeding structure according to an embodiment of this application.
Figure 13:
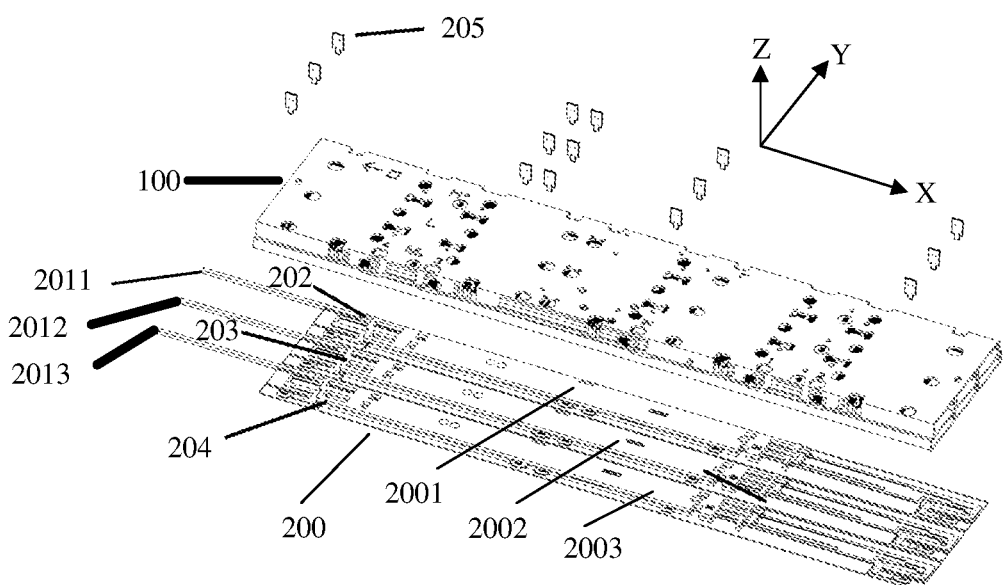
FIG. 13 is a schematic diagram of a disassembled structure of a feeding structure according to an embodiment of this application.
Figure 14:
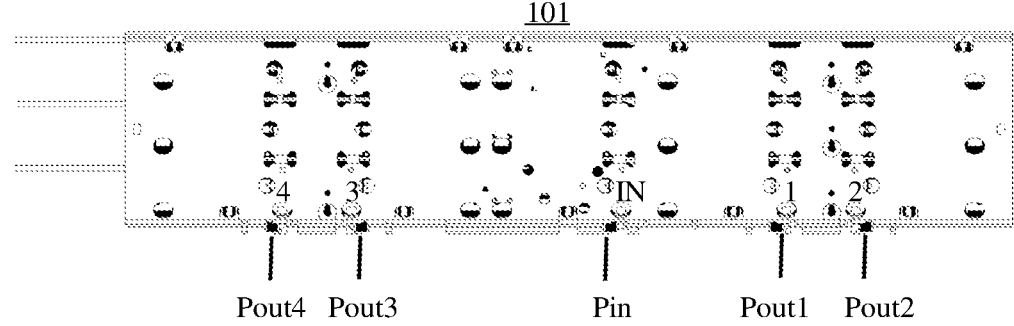
FIG. 14 is a top view of the feeding structure in FIG. 13.

FIG. 12 is a schematic diagram of a structure of a feeding structure according to this application. As shown in FIG. 12, the feeding structure includes: a phase shifter 200 and the foregoing signal transceiver apparatus 101, where the phase shifter 200 is electrically connected to the signal transceiver apparatus 101.

Example 1

As shown in FIG. 13, FIG. 14, FIG. 15, FIG. 16, and FIG. 17, the feeding structure includes: a signal transceiver module 100 and a phase shifter 200 that are stacked in a Z direction.

Figure 16:
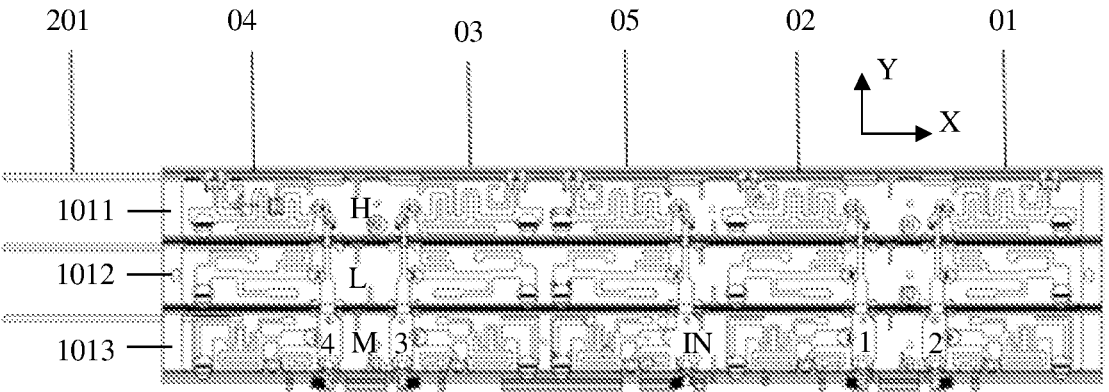
FIG. 16 is a top view of a signal transceiver apparatus in FIG. 13.
Figure 17:
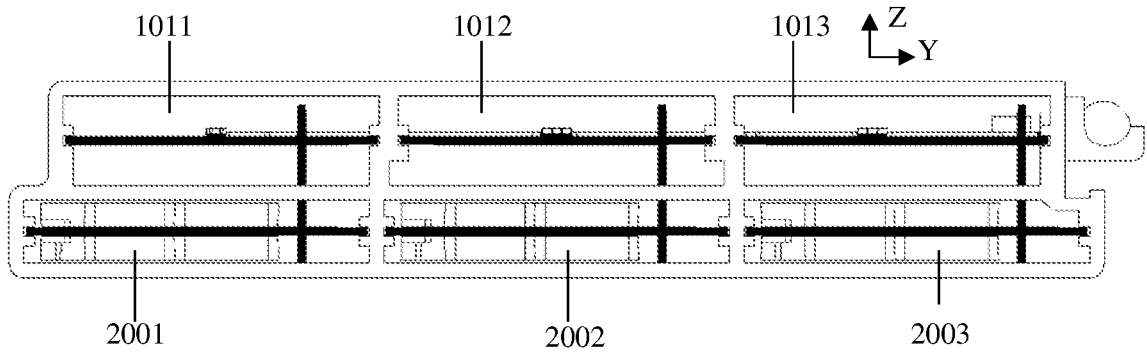
FIG. 17 is a sectional view of the feeding structure in FIG. 13.

As shown in FIG. 16 and FIG. 17, the signal transceiver module 100 includes: a first cavity 1011, a second cavity 1012, and a third cavity 1013 that are arranged in a Y direction; where five signal transceiver apparatuses: a first signal transceiver apparatus 01, a second signal transceiver apparatus 02, a third signal transceiver apparatus 03, a fourth signal transceiver apparatus 04, and a fifth signal transceiver apparatus 05 shown in FIG. 9 and FIG. 10 are disposed side by side in the first cavity 1011, the second cavity 1012, and the third cavity 1013 in an X direction.

For a setting manner of each signal transceiver apparatus, refer to the related descriptions in FIG. 8 and FIG. 9. Details are not described herein again.

Figure 15:
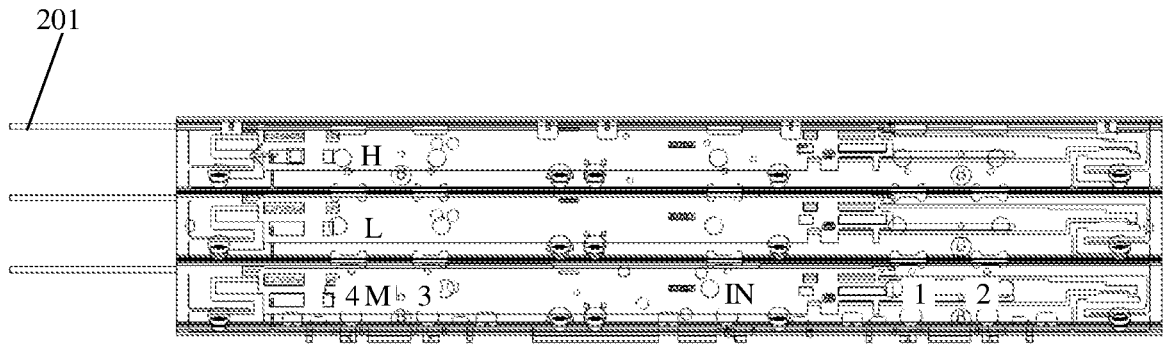
FIG. 15 is a top view of a phase shifter of FIG. 13.

As shown in FIG. 15, the phase shifter 200 includes: a fourth cavity 2001, a fifth cavity 2002, and a sixth cavity 2003, where each cavity is provided with a phase shifting structure. The fourth cavity 2001 is opposite to the first cavity 1011, the fifth cavity 2002 is opposite to the second cavity 1012, and the sixth cavity 2003 is opposite to the third cavity 1013. The phase shifter is configured to adjust a phase of a signal.

The feeding structure further includes: an input port Pin, a first output port Pout 1, a second output port Pout 2, a third output port Pout 3, and a fourth output port Pout 4.

The feeding structure further includes: a conductive inserting sheet 205, where each of the five signal transceiver apparatuses is electrically connected to the phase shifting structure through the conductive inserting sheet 205.

A connection structure of the fifth signal transceiver apparatus 05 is connected to the input port, the fifth signal transceiver apparatus 05 includes three filter circuits, and the fifth signal transceiver apparatus 05 is configured to divide a received signal into three paths.

Each filter circuit of the fifth signal transceiver apparatus 05 is connected to an input port of a phase shifter through a conductive inserting sheet.

Four output ports of the phase shifter are respectively connected to filter circuits of the first signal transceiver apparatus 01, the second signal transceiver apparatus 02, the third signal transceiver apparatus 03, and the fourth signal transceiver apparatus 04 through conductive inserting sheets.

In a use process, the input port Pin receives input signals of a frequency band 1, a frequency band 2, and a frequency band 3, the signals are divided into three paths after passing through the third signal transceiver apparatus 03, the three paths of signals are transmitted to an input port of the filter circuit of the third signal transceiver apparatus 03 respectively, then the three paths of signals are input to an input port of each phase shifting structure through the conductive inserting sheet 205, and corresponding power division and phase shifting are performed by using each phase shifting structure. In addition, the three paths of signals are output through four output ports of the phase shifter 200 and input to input ends of the filter circuits of the first signal transceiver apparatus 01, the second signal transceiver apparatus 02, the third signal transceiver apparatus 03, and the fourth signal transceiver apparatus 04 through an inserting sheet PCB, and finally, the three paths of signals are output at the output ports (the first output port Pout 1, the second output port Pout 2, the third output port Pout 3, and the fourth output port Pout 4) of the first signal transceiver apparatus 101, the second signal transceiver apparatus 101, the third signal transceiver apparatus 101, and the fourth signal transceiver apparatus 101.

In addition, the feeding structure further includes: a first pull rod 2011, a second pull rod 2012, a third pull rod 2013, a first sliding medium 202, a second sliding structure 203, and a third sliding medium 204.

The first pull rod 2011 is connected to the first sliding medium 202. When the first pull rod 2011 is pushed and pulled, the first sliding medium 202 slides relative to the first cavity 1011.

The second pull rod 2012 is connected to the second sliding medium 203. When the second pull rod 2012 is pushed and pulled, the second sliding medium 203 slides relative to the second cavity 1012.

The third pull rod 2013 is connected to the third sliding medium 204. When the third pull rod 2013 is pushed and pulled, the third sliding medium 204 slides relative to the third cavity 1013.

For example, each of the four output ports (the first output port Pout 1, the second output port Pout 2, the third output port Pout 3, and the fourth output port Pout 4) is connected to a radiating element of an array antenna. After the first pull rod 2011, the second pull rod 2012, and the third pull rod 2013 respectively drive the first sliding medium 202, the second sliding structure 203, and the third sliding medium 204 to move for a distance, the signals of the frequency band 1, the frequency band 2, and the frequency band 3 input by the Pin are adjusted by three phase shifters 200, and respectively feed required signal current intensity and phase to the radiating element in the frequency band 1, the frequency band 2, and the frequency band 3. Therefore, a direction of a radiation pattern of an array antenna on each of the frequency band 1, the frequency band 2, and the frequency band 3 is changed.

Example 2

Figure 18:
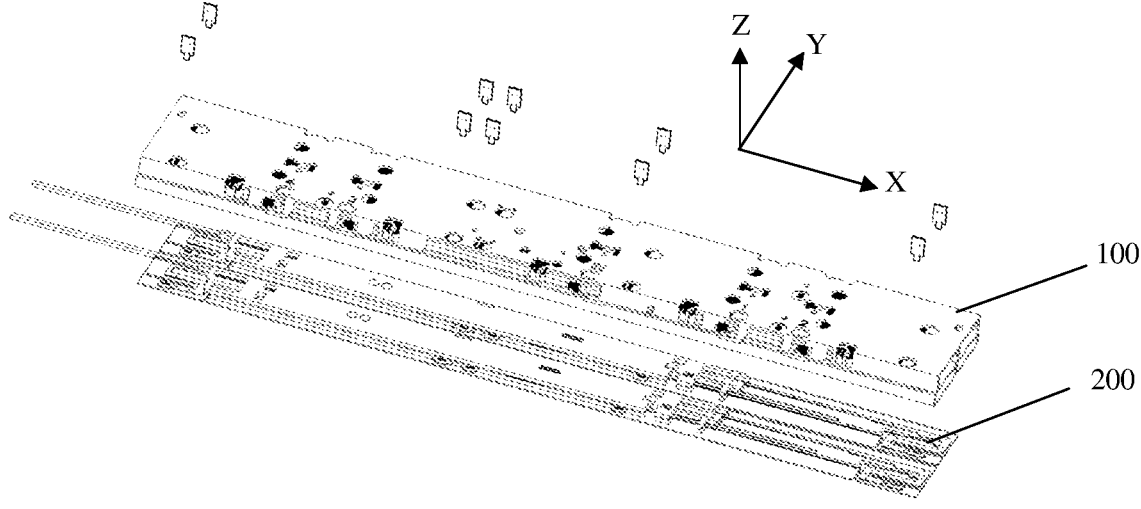
FIG. 18 is a schematic diagram of a disassembled structure of another feeding structure according to an embodiment of this application.
Figure 19:
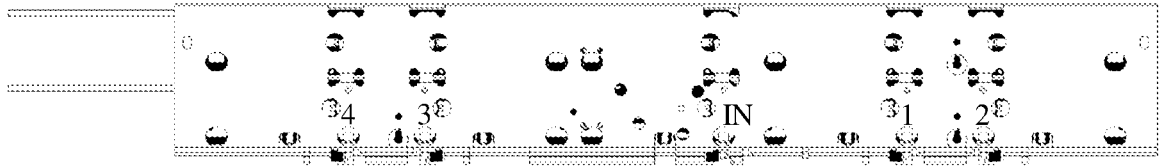
FIG. 19 is a top view of the feeding structure in FIG. 18.
Figure 20:
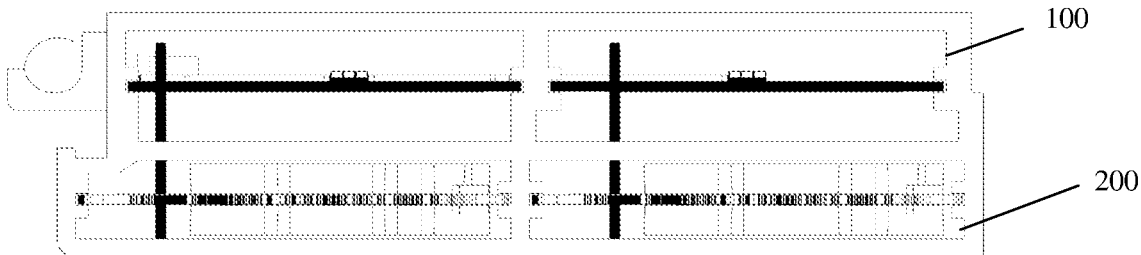
FIG. 20 is a sectional view of the feeding structure in FIG. 18.

An embodiment of this application further provides a feeding structure. As shown in FIG. 18, FIG. 19, and FIG. 20, the feeding structure includes: a signal transceiver module 100 and a phase shifter 200 that are stacked in a Z direction. The signal transceiver module 100 includes: two cavities arranged in a Y direction, where five signal transceiver apparatuses 101 shown in FIG. 6 and FIG. 7 are disposed side by side in the two cavities in an X direction.

The phase shifter also includes two cavities. For example structures and working processes of the signal transceiver apparatus 100 and the phase shifter 200, refer to Example 1. Details are not described herein again.

Figure 21:
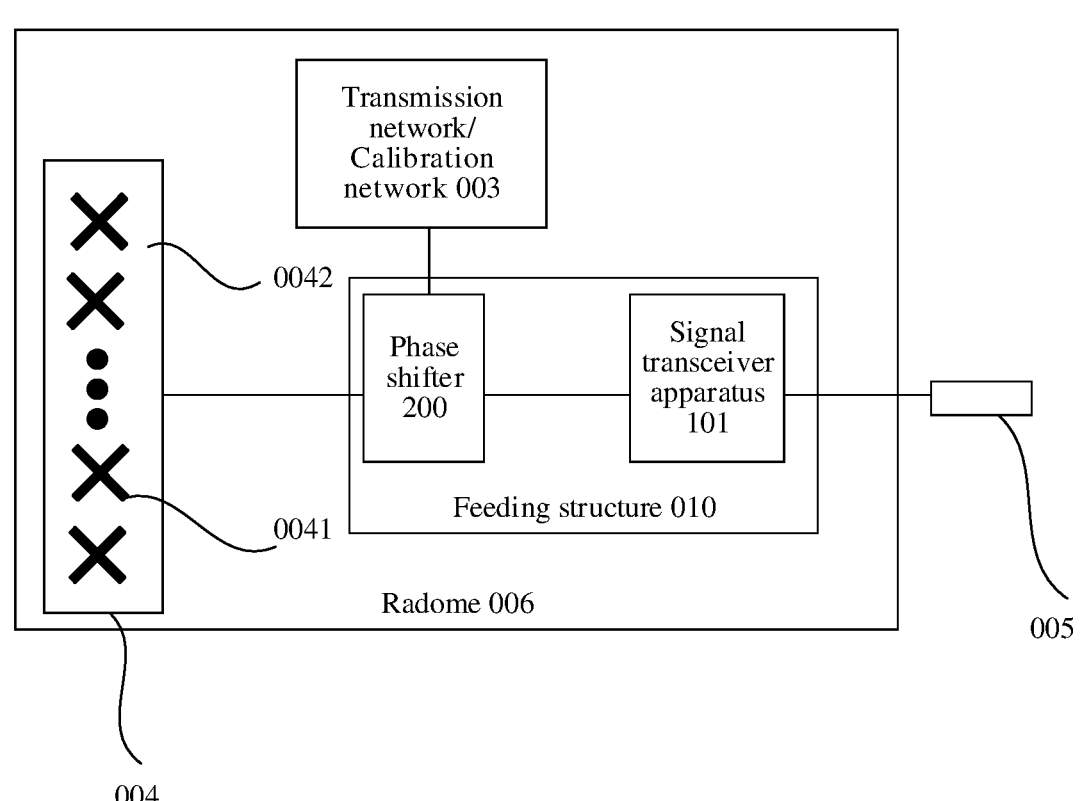
FIG. 21 is a schematic diagram of a structure of an antenna according to an embodiment of this application.

An embodiment of this application further provides an antenna 01. As shown in FIG. 21, the antenna 01 includes: at least one antenna array 004, where the antenna array 004 includes: at least one radiating element 0041, a reflection panel 0042, and the feeding structure 010 described above.

The radiating element 0041 is a unit forming a basic structure of the antenna array, and can effectively radiate or receive a radio wave. A frequency of each radiating element 0041 may be the same or different, and the radiating element 0041 is disposed above the reflection panel 0042.

The reflection panel 0042 (which is also referred to as a bottom panel, an antenna panel, or a metal reflecting panel) can improve receiving sensitivity of an antenna signal and concentrate reflection of the antenna signal at a receiving point. It not only greatly enhances the receiving/transmitting capability of the antenna, but also blocks and shields interference of other radio waves from the back (an opposite direction) to the received signal.

The feeding structure 010 is connected to the radiating element 0041, and the antenna array 004 may receive or transmit a radio frequency signal through the respective feeding structure 010.

The feeding structure 010 may feed a signal to the radiating element 0041 based on a specific amplitude and a specific phase, or send a received radio signal to a signal processing unit of a base station based on a specific amplitude and a specific phase. The feeding structure 010 is usually formed by a controlled impedance transmission line. The feeding structure 010 generally includes a phase shifter 200, and in some cases, may further include components such as a combiner and a filter.

The feeding structure 010 may implement different radiation beam directions through a transmission part, or be connected to a transmission network (or a calibration network) 003 to obtain a calibration signal required by a system.

The antenna 01 further includes: a radome 006, where the radiating element 0041, the reflection panel 0042, and the feeding structure 010 are located in a cavity enclosed by the radome 006.

The radome 006 is a structural part that can protect the antenna 01 from an external environment, has a good electromagnetic wave penetration characteristic in terms of an electrical property, and can withstand an external harsh environment in terms of mechanical performance.

Figure 22:
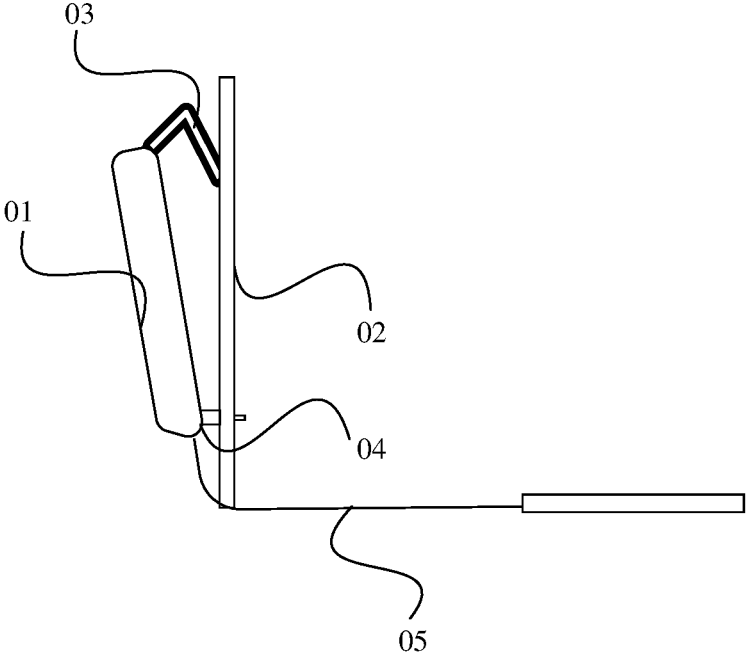
FIG. 22 is a schematic diagram of a structure of a base station antenna feeder system according to an embodiment of this application.

An embodiment of this application further provides a base station antenna feeder system. As shown in FIG. 22, the base station antenna feeder system includes: the antenna 01 as described above. The base station antenna feeder system further includes: a feeder 05, a pole 02, and an antenna adjustment support 03, where the feeder 05 is connected to the antenna 01 through, for example, an antenna connector 005, and a connector sealing member 04 is disposed outside the antenna connector 005. The connector sealing member 04 may use one of an insulation sealing tape or a PVC insulation tape.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A signal transceiver apparatus, comprising:
a base comprising at least one sidewall, the base having a first cavity and a second cavity defined therein;
a first interface in the first cavity;
a first filter circuit in the first cavity, the first filter circuit comprising a first end and a second end opposite to the first end, wherein the first end of the first filter circuit is connected to the first interface, and the first filter circuit is configured to transmit a signal of a first frequency band;
a second interface in the second cavity;
a third interface in the second cavity;
a second filter circuit in the second cavity, the second filter circuit comprising a first end and a second end opposite to the first end, wherein the first filter circuit and the second filter circuit are parallel, the first end of the second filter circuit is connected to the second interface, and the second filter circuit is configured to transmit a signal of a second frequency band; and
a connecting component comprising a first end and a second end opposite to the first end, and a third end between the first end of the connecting component and the second end of the connecting component, wherein the first end of the connecting component is in the first cavity, the first end of the connecting component is connected to the second end of the first filter circuit, the third end of the connecting component is in the second cavity, the third end of the connecting component is connected to the second end of the second filter circuit, and the second end of the connecting component is connected to the third interface, the connecting component is a single unitary structure that extends continuously from the first cavity through the second cavity to the third interface, the connecting component comprises impedance-transformed transmission line segments configured to perform impedance matching for signals of different frequency bands, and the connecting component is configured to transmit signals of the first frequency band and the second frequency band.

2. The signal transceiver apparatus according to claim 1, further comprising:
a first printed circuit board (PCB), wherein the first filter circuit is on the first PCB, the base has a first engaging slot in the first cavity, and the first PCB is connected to the base by way of the first engaging slot; and
a second PCB, wherein the second filter circuit is on the second PCB, the base has a second engaging slot is in the second cavity, and the second PCB is connected to the second engaging slot.

3. The signal transceiver apparatus according to claim 2, wherein
the base has a first opening in the first cavity, and a shape of the first opening matches a shape of the first PCB such that the first PCB engages with the first engaging slot through the first opening; and
the base has a second opening in the second cavity, and a shape of the second opening matches a shape of the second PCB such that the second PCB engages with the second engaging slot through the second opening.

4. The signal transceiver apparatus according to claim 1, wherein the base has a first welding port in the first cavity, the first welding port is over the first end of the connecting component, and the first end of the connecting component and the second end of the first filter circuit are welded through the first welding port, and the base has a second welding port in the second cavity, the second welding port is over the third end of the connecting component, and the third end of the connecting component and the second end of the second filter circuit are welded through the second welding port.

5. The signal transceiver apparatus according to claim 1, wherein the base has a third opening in the first cavity or the second cavity, and a shape of the third opening matches a shape of the connecting component such that the connecting component enters the first cavity and the second cavity through the third opening.

6. The signal transceiver apparatus according to claim 1, wherein the base further comprises a third cavity between the first cavity and the second cavity, and the signal transceiver apparatus further comprises:

a fourth interface is in the third cavity; and a third filter circuit in the third cavity, the third filter circuit comprising a first end and a second end opposite to the first end, wherein the first end of the third filter circuit is connected to the third interface, the second end of the third filter circuit is connected to a fourth end of the connecting component, and the third filter circuit is configured to transmit a signal of a third frequency band, the fourth end of the connecting component is between the first end of the connecting component and the third end of the connecting component, and the connecting component is further configured to transmit the signal of the third frequency band.

7. The signal transceiver apparatus according to claim 6, further comprising:

a third printed circuit board (PCB), wherein the connecting component is on the third PCB, the base has a third engaging slot in the third cavity, and the third PCB is connected to the third engaging slot, wherein the base has a third opening in the third cavity, and a shape of the third opening matches a shape of the third PCB.

8. The signal transceiver apparatus according to claim 6, wherein the base has a third welding port in the third cavity, the third welding port is over the fourth end of the connecting component such that the fourth end of the connecting component and the second end of the third filter circuit are welded through the third welding port.

9. The signal transceiver apparatus according to claim 6, wherein the first interface, the second interface, and the fourth interface are configured to connect to a signal input end, and the third interface is configured to connect to a signal output end.

10. The signal transceiver apparatus according to claim 6, wherein the first filter circuit, the second filter circuit, and the third filter circuit comprise a plurality of open circuit filter stubs.

11. The signal transceiver apparatus according to claim 10, wherein a length of at least one open circuit filter stub of the plurality of open circuit filter stubs is $$\frac{\lambda_1}{8} \text{ to } \frac{\lambda_1}{2},$$

where $\lambda_1$ is a wavelength corresponding to a stopband signal frequency band.

12. The signal transceiver apparatus according to claim 6, wherein the first interface, the second interface, and the fourth interface are configured to connect to a signal output end, and the third interface is configured to connect to a signal input end.

13. The signal transceiver apparatus according to claim 1, wherein a length of at least one of the impedance-transformed transmission line segments is greater than $$\frac{\lambda_2}{12},$$

where $\lambda_2$ is a wavelength corresponding to a maximum frequency in an input signal.

14. A feeding structure, comprising:

a phase shifter; and a signal transceiver apparatus electrically connected to the phase shifter, the signal transceiver apparatus comprising:

a base comprising at least one sidewall, the base having a first cavity and a second cavity defined therein;

a first interface in the first cavity;

a first filter circuit in the first cavity, the first filter circuit comprising a first end and a second end opposite to the first end, wherein the first end of the first filter circuit is connected to the first interface, and the first filter circuit is configured to transmit a signal of a first frequency band;

a second interface in the second cavity;

a third interface in the second cavity;

a second filter circuit in the second cavity, the second filter circuit comprising a first end and a second end opposite to the first end, wherein the first filter circuit and the second filter circuit are parallel, the first end of the second filter circuit is connected to the second interface, and the second filter circuit is configured to transmit a signal of a second frequency band; and a connecting component comprising a first end and a second end opposite to the first end, and a third end between the first end of the connecting component and the second end of the connecting component, wherein the first end of the connecting component is in the first cavity, the first end of the connecting component is connected to the second end of the first filter circuit, the third end of the connecting component is in the second cavity, the third end of the connecting component is connected to the second end of the second filter circuit, and the second end of the connecting component is connected to the third interface, the connecting component is a single unitary structure that extends continuously from the first cavity through the second cavity to the third interface, the connecting component comprises impedance-transformed transmission line segments configured to perform impedance matching for signals of different frequency bands, and the connecting component is configured to transmit signals of the first frequency band and the second frequency band.

15. The feeding structure according to claim 14, wherein the signal transceiver apparatus further comprises:

a first printed circuit board (PCB), wherein the first filter circuit is on the first PCB, the base has a first engaging slot in the first cavity, and the first PCB is connected to the base by way of the first engaging slot; and a second PCB, wherein the second filter circuit is on the second PCB, the base has a second engaging slot is in the second cavity, and the second PCB is connected to the second engaging slot.

16. The feeding structure according to claim 15, wherein the base has a first opening in the first cavity, and a shape of the first opening matches a shape of the first PCB such that the first PCB engages with the first engaging slot through the first opening; and the base has a second opening in the second cavity, and a shape of the second opening matches a shape of the second PCB such that the second PCB engages with the second engaging slot through the second opening.

17. The feeding structure according to claim 14, wherein the base has a first welding port in the first cavity, the first welding port is over the first end of the connecting component, and the first end of the connecting component and the second end of the first filter circuit are welded through the first welding port, and the base has a second welding port in the second cavity, the second welding port is over the third end of the connecting component, and the third end of the connecting component and the second end of the second filter circuit are welded through the second welding port.

18. The feeding structure according to claim 14, wherein the base has a third opening in the first cavity or the second cavity, and a shape of the third opening matches a shape of the connecting component such that the connecting component enters the first cavity and the second cavity through the third opening.

19. The feeding structure according to claim 14, wherein the base further comprises a third cavity between the first cavity and the second cavity, and the signal transceiver apparatus further comprises:

a fourth interface is in the third cavity; and a third filter circuit in the third cavity, the third filter circuit comprising a first end and a second end opposite to the first end, wherein the first end of the third filter circuit is connected to the third interface, the second end of the third filter circuit is connected to a fourth end of the connecting component, and the third filter circuit is configured to transmit a signal of a third frequency band, the fourth end of the connecting component is between the first end of the connecting component and the third end of the connecting component, and the connecting component is further configured to transmit the signal of the third frequency band.

20. The feeding structure according to claim 19, wherein the signal transceiver apparatus further comprises:

a third printed circuit board (PCB), wherein the connecting component is on the third PCB, the base has a third engaging slot in the third cavity, and the third PCB is connected to the third engaging slot, wherein the base has a third opening in the third cavity, and a shape of the third opening matches a shape of the third PCB.

* * * * *